US009163191B2

(12) United States Patent
Zeeck et al.

(10) Patent No.: US 9,163,191 B2
(45) Date of Patent: Oct. 20, 2015

(54) AUTOMATED PROCESS FOR HANDLING BALES FOR PELLET PRODUCTION

(75) Inventors: James Russell Zeeck, Gretna, NE (US); Charles J. Schneider, Omaha, NE (US)

(73) Assignee: Pellet Technology, LLC, Gretna, NE (US)

( * ) Notice: Subject to any disclaimer, the term of this patent is extended or adjusted under 35 U.S.C. 154(b) by 784 days.

(21) Appl. No.: 13/213,629

(22) Filed: Aug. 19, 2011

(65) Prior Publication Data

US 2012/0024992 A1     Feb. 2, 2012

Related U.S. Application Data

(63) Continuation-in-part of application No. 12/538,351, filed on Aug. 10, 2009, now Pat. No. 8,846,123.

(60) Provisional application No. 61/176,541, filed on May 8, 2009.

(51) Int. Cl.
*B02B 5/02*     (2006.01)
*B02C 9/04*     (2006.01)
(Continued)

(52) U.S. Cl.
CPC . *C10L 5/44* (2013.01); *C10L 5/363* (2013.01); *F23G 5/02* (2013.01); *F23G 5/033* (2013.01); *F23G 5/444* (2013.01); *F23G 5/50* (2013.01); *F23K 1/00* (2013.01); *F23K 1/02* (2013.01); *F23K 3/00* (2013.01); *B65G 47/252* (2013.01); *B65G 47/26* (2013.01); *F23G 2201/701* (2013.01); *F23G 2201/80* (2013.01); *F23G 2205/12* (2013.01); *F23G 2209/262* (2013.01); *F23G 2900/50206* (2013.01); *F23K 2201/10* (2013.01); *F23K 2201/20* (2013.01); *F23K 2201/30* (2013.01); *F23K 2201/50* (2013.01); *F23K 2201/505* (2013.01);

(Continued)

(58) Field of Classification Search
CPC ...... A01F 29/005; A23K 1/002; A23K 1/146; B02C 18/142; B02C 23/02; B02C 23/38; C02C 18/148; B29B 9/14; B65G 47/252; B65G 47/26; C10L 55/44; C10L 5/445; C10L 5/363; F23G 2900/50206; F23G 2900/55011; F23G 5/033; F23G 5/444; F23G 5/02; F23G 5/50; F23G 7/10; F23G 2201/701; F23G 2201/80; F23G 2205/12; F23G 2209/262; F23K 1/00; F23K 1/02; F23K 2201/10; F23K 2201/20; F23K 2201/30; F23K 2201/50; F23K 2201/505; F23K 2203/201; F23K 3/00; Y02E 50/10; Y02E 50/30
USPC ............ 44/589; 426/442, 30, 623; 241/152.2, 241/18, 24.1, 24.25, 25, 29, 42, 43, 68, 78; 264/140
See application file for complete search history.

(56) References Cited

U.S. PATENT DOCUMENTS 3,915,392 A * 10/1975 Kugler ........................... 241/74
4,082,859 A     4/1978 Katzen
(Continued)

*Primary Examiner* — James Goloboy
*Assistant Examiner* — Latosha Hines
(74) *Attorney, Agent, or Firm* — McKee, Voorhees & Sease, PLC

(57) ABSTRACT

An automated system and method are provided for conveying plant material bales. The system and method retrieves stacked bales from a storage site and places the bales on a conveyor assembly line, wherein the bales are indexed, accumulated, and metered for discharge into a bale shredder. Once the bales are on the conveyor assembly, the bales are automatically moved and arranged without manual intervention.

27 Claims, 3 Drawing Sheets

(51) Int. Cl.
*B02C 19/00* (2006.01)
*B03B 7/00* (2006.01)
*C10L 5/44* (2006.01)
*C10L 5/36* (2006.01)
*F23G 5/02* (2006.01)
*F23G 5/033* (2006.01)
*F23G 5/44* (2006.01)
*F23G 5/50* (2006.01)
*F23K 1/00* (2006.01)
*F23K 1/02* (2006.01)
*F23K 3/00* (2006.01)
*B65G 47/252* (2006.01)
*B65G 47/26* (2006.01)

(52) U.S. Cl.
CPC .... *F23K 2203/103* (2013.01); *F23K 2203/201* (2013.01); *Y02E 50/10* (2013.01); *Y02E 50/30* (2013.01)

(56) References Cited

U.S. PATENT DOCUMENTS

| | | | |
|---|---|---|---|
| 4,515,816 A | 5/1985 | Anthony | |
| 4,613,339 A | 9/1986 | Gunnerman et al. | |
| 5,017,399 A * | 5/1991 | Montano et al. | 426/636 |
| 5,217,174 A * | 6/1993 | Martin et al. | 241/222 |
| 6,506,223 B2 | 1/2003 | White | |
| 7,494,675 B2 | 2/2009 | Abbas et al. | |
| 7,998,511 B2 | 8/2011 | Abbas et al. | |
| 2003/0070779 A1 | 4/2003 | Bransby | |
| 2004/0231060 A1 | 11/2004 | Burdette et al. | |
| 2007/0283620 A1 | 12/2007 | Karpik | |
| 2008/0045762 A1* | 2/2008 | Foody et al. | 585/240 |
| 2008/0220125 A1 | 9/2008 | Abbas et al. | |
| 2008/0280236 A1 | 11/2008 | Wright | |
| 2009/0064569 A1 | 3/2009 | Khater | |
| 2009/0205546 A1 | 8/2009 | Kluko | |
| 2010/0146850 A1 | 6/2010 | Bexell | |

* cited by examiner

AUTOMATED PROCESS FOR HANDLING BALES FOR PELLET PRODUCTION

CROSS-REFERENCE TO RELATED APPLICATIONS

This application is a continuation-in-part of Applicant's co-pending application, Ser. No. 12/538,351 filed on Aug. 10, 2009, which claims priority to U.S. Ser. No. 61/176,541 filed May 8, 2009, all herein incorporated by reference in their entirety.

FIELD OF THE INVENTION

The present invention is directed towards an automated process for the handling and processing of bales of plant material for use in pellet manufacturing and other related biomass processing and in particular, the use of agricultural wastes and residues as well as energy crops that lack natural binders.

BACKGROUND OF THE INVENTION

Biomass feedstock is useful in numerous industries such as the production of cellulosic ethanol, electricity production, feed, heating fuels, and other commercial applications.

The 2005 Billion Ton study by the U.S. Department of Energy and U.S. Department of Agriculture concluded that agricultural and forest based biomass can displace 30% of the U.S. petroleum consumption by using approximately one billion dry tons of biomass feedstock per year.

The Energy Independence and Security Act of 2007 requires the United States to make one billion gallons of cellulosic ethanol from wheat straw, corn stover, rice straw, soybean stubble, milo stubble, forage sorghum, prairie hay, woodchips, cotton-gin residue, and a dozen other forms of agricultural waste and residues. In the past, such waste and residues materials have been generally considered to be of little or no value. In the past, meaningful volumes of cellulosic biomass agriculture material have not been brought to market on a commercial scale due to difficulties in integrating the supply chain to source, harvest, transport, store, and process the material at a profit. Cellulosic ethanol producers and other renewable biomass users like electric utilities and industrial co-generation facilities require reliable supplies of high quality biomass feedstocks. Successful and economic production of biofuels will facilitate independence from fossil and petroleum-based fuels and reduce environmental concerns relating to production, transportation, storage, and use of such fuels; cellulosic ethanol is the only real sustainable transportation liquid fuel. Thus, when correctly pursued, cellulosic ethanol can address many of the issues undermining national security and environmental well-being.

Biomass production from corn, soy, wheat, and other stover has not been practical or economical due to several barriers and risks. The use of crop stover in commercial scale production has been unsuccessful primarily due to (1) cost and logistics of stover (due to the low density of product) delivery for processing; (2) cost of protecting stored stover bales from weather and fire; (3) stover degradation; (4) durability in withstanding standard material handling and transportation; (5) inability to use current material handling/storage infrastructure, resulting in high capital and operating costs; and (6) lack of a proven and reliable grinding shredding and pellet processing system for agriculture waste and residues that works on a mass commercial scale and does not use binding agents or other additives.

The agricultural residue and energy feed stock supply chain is an important component of large scale biofuel production and meaningful electric generation, but it has yet to be established, thereby slowing deployment of cellulosic ethanol production, electrical generation, and other renewable energy technologies. The financial risks associated with feedstock ability to effectively be stored and transported to market and processed on a continuous year-round basis are a significant concern for investors and lenders.

Pelletizing of certain types of agricultural materials is an established practice. These agricultural materials are usually used as animal feed but more recently, some food crops such as hybrid corn, soybean oil, and sugar cane have been used for energy production. Alfalfa is one example of a feed crop that has been pelletized for years. Although it has only been used on a very small scale for fuel pellets, alfalfa has come under fire in the food for fuel debate. These types of feed crops contain protein, starch, sugar, and/or fat that serve as a natural binder in the pelletizing process.

Pelletizing non-food and non-primary feed crop residues has been problematic due to the lack of natural binders. For example, corn stover, soybean stubble, wheat straw, fruit tree trimmings, and walnut shells do not contain substantial protein or starch, which are natural binders. Thus, binder additives have to be used to facilitate pellet formation, which adds costs and creates emission concerns, making agricultural residue pellets undesirable or unfeasible due to environmental issues. Also, pellets made with binders are subject to decomposition and breakdown during normal handling, storage, and transport which decreases the percentage of useful pellets. Agricultural residues have been used as a feed additive due to the fiber content, but they are currently not a primary feed ingredient. Traditional pellet processing uses steam conditioning to pelletize; this reduces yields for liquid fuels producers and results in lower BTU value during combustion. The Applicant's pellet manufacturing process does not use binders or steam conditioning.

SUMMARY OF THE INVENTION

A primary objective of the present invention is the provision of an automated process or method for handling and conveying agricultural waste, agricultural residue, and energy crop ("plant material") bales for use in a commercial application including, but not limited to, a pellet production facility.

Another objective of the present invention is the provision of a method for automatically transporting plant material bales from a storage or staging area to a shredding station of a commercial production facility, such as a pellet processing facility.

Another objective of the present invention is the provision of a method and means for handling bales of plant material for delivery from a storage or staging area to a bale shredder for continuous, uninterrupted operation of the shredder.

A further objective of the present invention is the provision of a method and means for transporting plant material bales with minimal manual involvement.

Still another objective of the present invention is the provision of an automated bale handling process that is efficient, effective, and economical.

These and other objectives will become apparent from the following description of the invention as used (for example) in a pellet production facility. All or some of these same objectives would apply to other commercial applications seeking to process baled plant material.

The overall objective used in the design of the standard pellet production facility is to efficiently receive, unload, store, handle, shred, grind, densify (pelletize), and load-out 200,000 tons per year (TPY) of corn stover or other plant material. The corn stover or other plant material is received at the processing facility as truckloads of baled plant material for conversion into a final densified product. Once densified, the pellets are conveyed using standard grain handling equipment and transported using standard grain truck and railroad transportation equipment. This provides a final product from the plant material that can be handled and transported using the infrastructure already commercially available and in place in the US marketplace.

The automated process for handling plant material bales, according to the present invention, retrieves stacked bales 12 bales at a time from a staging or storage area and then places the stacked bales on a de-stacker conveyor. The bales are then automatically unstacked and moved to an indexer feed conveyor that indexes the bales from a double to a single file end-to-end line. Next, the indexed bales are moved to an accumulation conveyor, followed by a metering conveyor, so that the bales can be arranged or positioned without gaps. The bales are then moved to a shredder in-feed conveyor, which deposits the bales into the shredding machine.

For example, a standard 200,000 tons per year pellet processing facility will process bales 310 days per year, 24 hours per day. To match the corn stover collection program and to ensure control of the feedstock, 104,000 tons of bales are required on site. This equals 174,510 bales on site with the facility consuming 1,125 bales, each weighing approximately 1,200 pounds per day. The bale transporting and conveying is designed to accommodate this quantity of bales and to keep the facility running at maximum capacity 24 hours per day.

DETAILED DESCRIPTION OF THE PREFERRED EMBODIMENT

Figure 1:
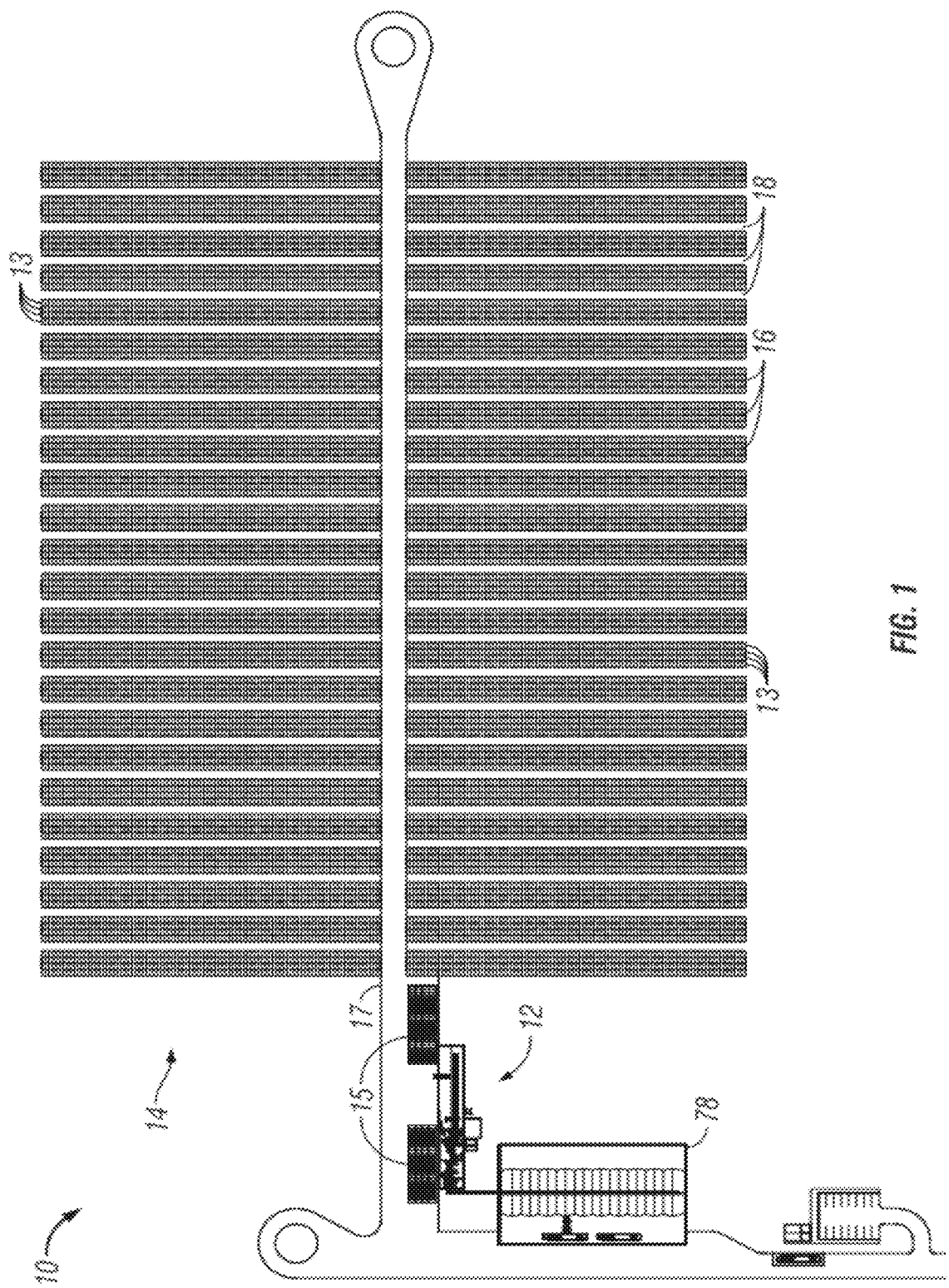
FIG. 1 is a schematic site plan for bale storage, pellet production, and pellet storage in accordance with the present invention.
Figure 2:
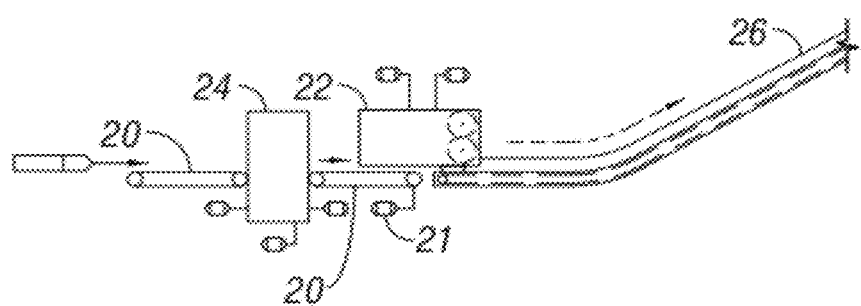
FIG. 2 is a schematic elevation view of a bale conveyor system and shredder according to the present invention.

The automated system and process for handling plant material bales is intended for use at a pellet production or other plant material processing facility 10, such as shown in FIG. 1, as described in Applicants' co-pending priority application. In this facility 10, plant material bales, no. 13 in FIG. 1, are received on flatbed trucks from the harvest field, unloaded by the truck's hydraulic lift or removed from the trucks with telehandlers depending on type of truck used, and stacked in a storage area 14 or staged in a staging area 15 adjacent to the pelletizing process area 12.

The receiving and storage process is designed for receiving 3'×4'×8' bale, no. 13 in FIG. 1. The bales, no. 13 in FIG. 1, are stored either in bale staging stacks 15 adjacent to the processing area 12 or in storage stacks 16 in the storage area 14 for longer-term storage, with the appropriate buffer rows 18 or borders. A driveway 17 is provided between the opposite rows of stacks, as seen in FIG. 1. The staging and storage areas 14, 15 are built with appropriate drainage. The bales in the storage area 14 are covered with a water resistant and fire retardant tarp or cover. The bales in the staging area 15 may also be covered.

The automated bale handling process preferably includes two parallel conveying, shredding, and grinding lines each designed to process 16 tons per hour of baled plant material into the ground plant material required for the balance of the pelleting process. For simplicity, FIG. 3 only shows one line, with the second line being a duplicate of the line of FIG. 3 except that bale destacker feed conveyor 112 would not be included in the second line and may not be included in the first line. Also the accumulation conveyor 124 in the second line may be a different length. These changes from the equipment shown on FIG. 3 would be based on the equipment layout.

Site Bale Receiving and Storage

The pellet processing plant 10 fiscal year preferably runs from October 1 to September 31. The harvest begins on or about October 1 and lasts approximately six weeks. During this six week time frame, all of the plant material will be collected, baled, and stacked for pickup and delivery to the pellet processing plant 10. For the standard 200,000 tons per year pellet plant, the stover requirement is approximately 209,000 tons (including shrinkage allowance) or approximately 349,000 bales. The transport of the stover bales, no. 13 in FIG. 1, from field to plant will take approximately six months and be delivered by approximately 120 truckloads per day operating five days per week.

The plant will be processing approximately 250 truckloads of stover bales per week as the plant runs at full rate. With this schedule, approximately 50% of the bales will be unloaded directly into the staging area 15 and processed and not placed into the bale storage area 14. This minimizes the size of the required bale storage area 14, bale handling time, and equipment usage.

The preferred design includes provisions for forty-eight storage stacks 16 (3,600 bales each) on the site and two bale staging stacks 15 (1,800 bales each) located adjacent to the processing building. The bale storage area 14 resides on 32 acres, which is a 1632'×940' area.

The bale storage area 14 is designed to store 48 individual bale stacks 13 that are each 6 bales (48 feet) wide, 100 bales (400 feet) long and 6 bales (18 feet) high. Each stack will contain approximately 3,600 bales. The stacks 16 are to be separated by a minimum of 20 feet to provide a buffer area for water drainage and fire protection. The storage area 14 is prepared in two halves separated by a 16-foot wide, hard surfaced center roadway for bale unloading and bale retrieval. Grading of the storage area is designed to move surface water away from the center roadway and bale stacking area. The area under the bales will be a graded dirt surface. Rock will not be used for this surface to minimize the amount of debris that is picked up by the bottom bales.

Bale Retrieval and Transportation from Storage to Shredder

Two bale retriever trucks 110 will be used to move bales from bale storage area 14 to one of the conveyor lines 20. One commercially available retriever truck for moving the bales is sold by Hauser Built Farm and Machine, LLC of Camp Verde, Ariz., Model 3412 "Super Retriever". This bale retriever truck has three axels with a 46,000 pound GVW. The fully loaded bale retriever truck 110 can pick up and carry six bales stacked two high, for a total of 12 bales per load. The truck 110 has hydraulically operated clamps to pick up and lay down the stack of 12 bales. The truck 110 also is equipped with a conveyor belt to transfer the bales 13 onto a bale destacker feed conveyor 112 or a destacker conveyor 114. The destacker feed conveyor 112 may be eliminated in some applications, such that the bales are moved from the truck 110 directed to the destacker conveyor 114.

The operator of the bale retriever truck 110 will drive down the hard surface center roadway to one of the bale storage stacks 16. The operator will stop the truck 110, and tilt the bed of the bale retriever truck up to a full vertical position. The operator will then back the truck up to the stack, positioning the vertical bed of the truck next to the bale stack. The operator will engage the hydraulic "clam shell grapple" which grabs the bottom two bales of the stack, then the top of the stack is hydraulically secured by the front end retriever clamps. The stack is now secure, and the bed of the truck is then lowered to the horizontal position for transport to the bale destacker feed conveyor 112, if present, or the destacker conveyor 114. This task of loading the bales onto the bale retriever truck 110 is accomplished without the operator of the bale retriever truck leaving the cab, and without any assistance from an additional operator. The bale retriever truck 110 will return to the plant using the hard surface center roadway.

Bale Off-Loading and De-Stacking

The bale retriever truck 110 returns from the bale storage site 14 and begins the unload process by backing up to the bale destacker feed conveyor 114 (or the feed conveyor 112, if present in the conveyor line). The fully loaded stack retriever truck has 6 bales by 2 bales high for a total of 12 bales per load on the retriever bed.

The bale retriever truck driver views the status of bale destacker feed conveyor 114. A sensor (not shown) on bale destacker feed conveyor 114 (or the feed conveyor 112, if present in the conveyor line) will send a signal to red and green lights attached to a pole. A green light signals that space is available on the conveyor and the driver can begin unloading. A red light signals the driver to wait. When a green light shows the conveyor 114 is clear and ready, the driver starts the bale discharge conveyor on the retriever truck 110 and discharges the bale load.

As the bales are transferred from the stack retriever truck 110 to the bale destacker feed conveyor 112 or the destacker conveyor 114, they will remain stacked six bales by two bales high. This operation is accomplished without the operator of the stack retriever truck 110 leaving the cab, or any assistance from an additional operator.

The empty stack retriever truck 110 returns to the bale storage site 14 and picks up the next 12 bale load. The average round trip cycle time including loading, travel to plant, unloading, and returning to the bale storage stack is approximately 16 minutes or 46 bales per hour per bale retriever truck. The plant requires 47 bales per hour to achieve the rate design capacity and therefore requires two bale retriever trucks to ensure the plant can run at 100% capacity.

Bale Destacking System

A bale destacker 116 is provided on the downstream end of the destacking conveyor 114 to unstack the two-high stack of bales on the conveyor 114. The destacker 116 rotates the two bales down on to a bale indexer feed conveyor 120, such that the bales are positioned with the 4'×8' side resting on the conveyor bed and a 3' bale side extending upwardly. Thus, the indexer feed conveyor 120 stages two bales end to end and moves the bales one at a time on to the bale indexing conveyor 122 when there is a call or demand for another bale. A sensor (not shown) on the end of the bale indexer feed conveyor 120 will signal the bale destacker 116 when there is room to place the next two bales.

When the indexer feed conveyor 120 is open or has room, the destacker 116 rotates the next two stacked bales on the conveyor 114 outwardly on to the feed conveyor 120. A sensor (not shown) will tell conveyor 114 when to stop in order for the bale destacker 116 to grab the next 2 bales. Thus, the flow of bales continues uninterrupted as the destacker conveyor 114 moves the bale stack forwardly for discharge of the bales by the destacker 116 on to the indexer feed conveyor 120.

Bale Indexing, Accumulation, and Metering

The bales are indexed, accumulated and metered on the conveyors 122, 124 and 128, respectively. The indexing conveyor 122 is used to start and stop, adjusting the bales from a stack of two to one, which puts the plant material onto the conveyor at the proper time. The accumulation conveyor 124 adjusts its speed to ensure that an even flow of material is delivered and assures the proper lining up of bales to the metering conveyor 128. The metering conveyor 128 is used to flow material at a specific rate to the shredder 22.

More particularly, the bales are indexed one at a time from the feed conveyor 120 to the indexer conveyor 122 using a sensor (not shown) to tell the feed conveyor 120 when to start and push the next bale onto indexer conveyor 122. The indexer conveyor 122 then pushes the bales off one at a time on to the bale accumulation conveyor 124. In the preferred embodiment, the accumulation conveyor 124 extends at a right angle to the indexing conveyor 122. A bale indexer or pusher 125 moves the bale from the indexer conveyor 122 to the accumulator conveyor 124. The pusher 125 is preferably a rack and pinion assembly, though it is understood that another mechanism may be used to move the bale from the indexing conveyor 122 to the accumulator conveyor 124. The pusher 125 is activated by a bale limit switch (not shown) on the accumulation conveyor 124 when a space is available on the accumulation conveyor 124. Preferably, the accumulation conveyor 124 can hold 7-10 bales.

The accumulation conveyor 124 is a belt conveyor that is used to accumulate bales. The accumulation conveyor 124 runs continuously. A bale stop 126 is located at the discharge end of the accumulation conveyor 124 and stops the bales until a call from the metering conveyor 128 is received. When the sensor (not shown) on the metering conveyor 128 senses an opening on the metering conveyor, a signal is sent to retract the bale stop 126 so that a bale is discharged from the accumulation conveyor 124 onto the metering conveyor 128. When the bale has been discharged, as confirmed by another sensor on the metering conveyor 128, the bale stop 126 closes. Another sensor on the accumulation conveyor 124 indicates if no bales are present at the discharge end of the accumulation conveyor for more than two minutes so as to speed up the VFD motor 21 so as to quickly deliver a bale from the accumulation conveyor 124 to the metering conveyor 128.

Preferably, the metering conveyor 128 is a belt conveyor and runs 20% faster than the shredder in-feed conveyor 130, to ensure there is no gap between bales on the in-feed conveyor 130. When a sensor on the in-feed conveyor 130 calls for a bale, the metering conveyor 128 runs until the bale is discharged and the gap between bales on the in-feed conveyor is closed, as indicated by a second sensor on the upstream end of the in-feed conveyor 130.

As the bales are conveyed to the bale shredder 22, they pass through a de-stringer 24 where the twine ties are automatically cut on the bottom of the bale and the loose twine is hooked from the top and removed from the bale.

The accumulation conveyor 124 feeds the bale metering conveyor 128, which preferably accommodates two bales, end to end, at a time. The metering conveyor 128 transports the bales in a continuous stream, without gaps, on to the bale shredder in-feed conveyor 130. The shredder conveyor 130 pushes the bales into the bale shredder 22. The speed of the shredder conveyor 130 may be varied, along with the in-feed roller of the shredder 22 so as to provide constant feed to the shredder as determined by the amperage of the shredder. The shredder 22 runs continuously at 90-95% maximum amperage and is controlled by the speed of the in-feed roller and the shredder conveyor 130. The shredder load set point is reset by the downstream hammermill/grinder full load amps, and/or by the level in the ground stover surge bin. The shredder conveyor 130 is preferably hydraulically driven and controlled from the shredder control panel. If the hammermill/grinder starts to overload, the speed of the shredder conveyor 130 is reduced. If the level in the stover surge bin reaches its upper limit, a level transmitter will signal the shredder conveyor 130 to reduce speed to prevent overfilling.

Figure 3:
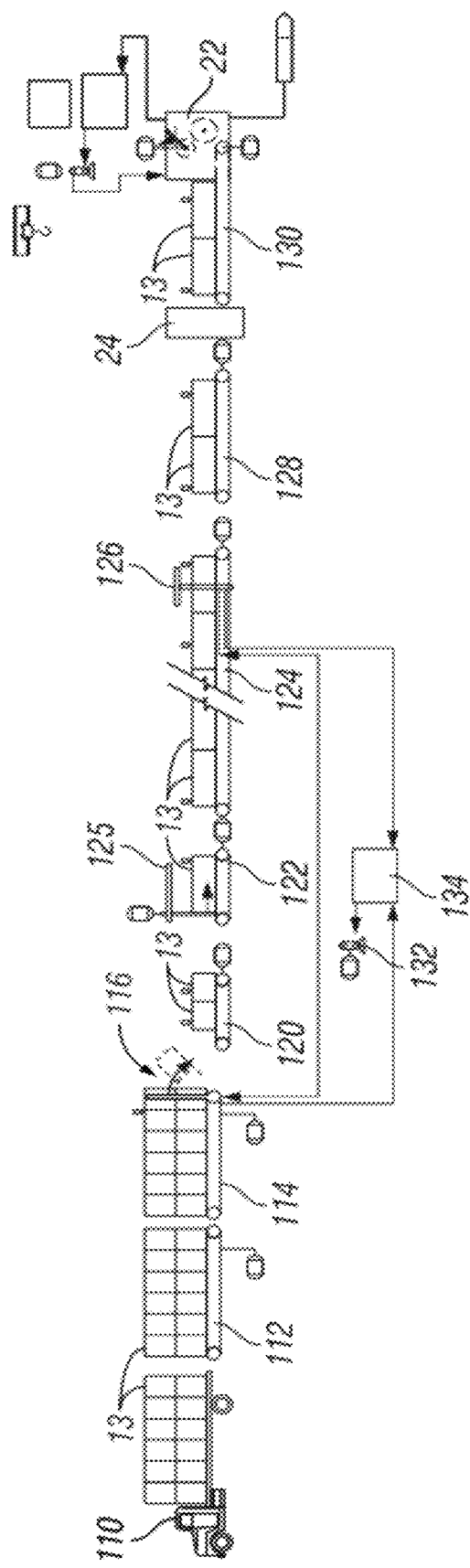
FIG. 3 is a detailed schematic elevation view of the various bale conveyor components. There are two sets of these components to achieve the 200,000 tons per year capacity of the pellet processing plant or comparable commercial facility involved in plant material processing.

The bale destacker 116 and the bale stop 126 are preferably hydraulically actuated. A hydraulic circuit including a pump 132 and a power unit 134 are operatively connected to the destacker 116 and the bale stop 126, as shown in FIG. 3.

Equipment Specification

The following specifications provide an example of the various components in the bale handling system of the present invention. To achieve the 200,000 TPY plant capacity, two lines are required with the following equipment as noted in the "(two each)" designation.

Bale Stack Retriever Truck 110 (Two Each)

Hauser Built Model 3412, 12-bale Stack Retriever mounted on a 3-axel truck. Retriever bed equipped with tri-rams & pivot design, 20' bed×104" wide with a 4-strand self-unloading chain conveyor built into the truck bed. Hauls (12) 3'×4' big bales per load.
  Rate: At maximum travel distance to onsite storage pile, one round trip requires 13 minutes with an overall travel speed of 8 mph including 3 minutes to load and 3 minutes to unload.

Bale Destacker Feed Conveyor 112 (One Each, if Necessary—Dependent on Layout)
  Materials: Carbon Steel—2 coats finished paint.
  Size: 9' wide slider bed×20' long.
  Frame: 8" channel with ¼" thick slider bed.
  Side Boards: ¼" thick plate reinforced with 2½"×2½" angle bolted to the 8" channel with 3×3 angle vertical stiffeners. Height 8'.
  Legs: 2 sets 6" channel legs.
  Head Pulley: 9' wide×18" diameter crowned and lagged steel pulley with 2" shaft, out board bearings Dodge flanged 4-bolt type.
  Tail Pulley: 9' wide×12" diameter steel pulley with 1½" diameter bearings mounted in Dodge take-up bearing frame with 6" of take up.
  Snub Pulley: 9' long×8" diameter with 1½" shaft. And Dodge 4 bolt flanged bearings.
  Return Pulley: None
  Belting: Apache 2-ply number 26C, 220 PIW, heavy duty belting 7' wide.
  Drive: Dodge parallel shaft reducer with 15 HP 480/3phase motor inverter duty rated.
  Final Drive: Chain and sprocket, 1:1 ratio with OSHA approved chain guard.
  Belt Speed: 10 FPM Bale Destack Conveyor 114 (Two Each)
  Materials: Carbon Steel—2 coats finished paint.
  Size: 9' wide slider bed×23' long.
  Frame: 8" channel with ¼" thick slider bed.
  Side Boards: ¼" thick plate reinforced with 2½"×2½" angle bolted to the 8" channel with 3×3 angle vertical stiffeners. Height 8'.
  Legs: 4 sets 6" channel legs.
  Head Pulley: 9' wide×18" diameter crowned and lagged steel pulley with 2" shaft, out board bearings Dodge flanged 4-bolt type.
  Tail Pulley: 9' wide×12" diameter steel pulley with 1½" diameter bearings mounted in Dodge take-up bearing frame with 6" of take up.
  Snub Pulley: 9' long×8" diameter with 1½" shaft. And Dodge 4 bolt flanged bearings.
  Return Pulley: None
  Belting: Apache 2-ply number 26C, 220 PIW, heavy duty belting 7' wide.
  Drive: Dodge parallel shaft reducer with 10 HP 480/3phase motor inverter duty rated.
  Final Drive: Chain and sprocket, 1:1 ratio with OSHA approved chain guard.
  Belt Speed: 10 FPM Bale Destacker 116 (Two Each)
  Bale Clamp: Mil-Stak 8' wide bale clamp with 8' long clamp arms.
  Bale Stack Support Frame: Fabricated 2-post support stand with 2" Dodge 4 bolt bearings, 2" shaft and 3" hydraulic cylinder—Cylinder and arm for 90° rotation. Complete with 4-way dual solenoid positioning valve.
  Rate: Normal 30 Bales per Hour. Maximum rate 60 Bales per Hour.
  Hydraulic Supply: From P-1201 Hydraulic Pump System.

Bale Indexer Feed Conveyor 120 (Two Each)
  Materials: Carbon Steel—2 coats finished paint.
  Size: 9' wide slider bed×10' long.
  Frame: 8" channel with ¼" thick slider bed.
  Side Boards: ¼" thick plate reinforced with 2½"×2½" angle bolted to the 8" channel. Height 3'.
  Legs: 2 sets 6" channel legs.
  Head Pulley: 9' wide×18" diameter crowned and lagged steel pulley with 2" shaft, out board bearings Dodge flanged 4-bolt type.
  Tail Pulley: 5' wide×12" diameter steel pulley with 1½" diameter bearings mounted in Dodge take-up bearing frame with 6" of take up.
  Snub Pulley: 5' long×8" diameter with 1½" shaft. And Dodge 4 bolt flanged bearings.
  Return Pulley: None
  Belting: Apache 2-ply number 26C, 220 PIW, heavy duty belting 7' wide.
  Drive: Dodge parallel shaft reducer with 3 HP 480/3phase motor inverter duty rated.
  Final Drive: Chain and sprocket, 1:1 ratio with OSHA approved chain guard.
  Belt Speed: 14 FPM maximum, on VFD Bale Index Conveyor 122 (Two Each)
  Materials: Carbon Steel—2 coats finished paint.
  Size: 5' wide slider bed×6' long.
  Frame: 8" channel with ¼" thick slider bed.
  Side Boards: ¼" thick plate reinforced with 2½"×2½" angle bolted to the 8" channel. Height 3'. One side only.
  Legs: 2 sets 6" channel legs.
  Head Pulley: 5' wide×18" diameter crowned and lagged steel pulley with 2" shaft, out board bearings Dodge flanged 4-bolt type.
  Tail Pulley: 5' wide×12" diameter steel pulley with 1½" diameter bearings mounted in Dodge take-up bearing frame with 6" of take up.
  Snub Pulley: 5' long×8" diameter with 1½" shaft. And Dodge 4 bolt flanged bearings.

Return Pulley: None
Belting: Apache 2-ply number 26C, 220 PIW, heavy duty belting 5' wide.
Drive: Dodge parallel shaft reducer with 3 HP 480/3phase motor inverter duty rated.
Final Drive: Chain and sprocket, 1:1 ratio with OSHA approved chain guard.
Belt Speed: 14 FPM maximum, on VFD
Bale Accumulating Conveyor 124 (Two Each) Length may vary Dependent on Layout
  Materials: Carbon Steel—2 coats finished paint.
  Size: 5' wide slider bed×minimum 58' long up to a max of 83' long.
  Frame: 8" channel with ¼" thick slider bed.
  Side Boards: ¼" thick plate reinforced with 2½"×2½" angle at top, bolted to the 8" channel frame. Height 3'.
  Legs: 8 sets 6" channel legs.
  Head Pulley: 5' wide×18" diameter crowned and lagged steel pulley with 2" shaft, out board bearings Dodge flanged 4-bolt type.
  Tail Pulley: 5' wide×12" diameter steel pulley with 1½" diameter bearings mounted in Dodge take-up bearing frame with 6" of take up.
  Snub Pulley: 5' long×8" diameter with 1½" shaft. And Dodge 4 bolt flanged bearings.
  Return Pulley: None
  Belting: Apache 2-ply number 26C, 220 PIW, heavy duty belting 5' wide.
  Drive: Dodge parallel shaft reducer with 10 HP 480/3phase motor inverter duty rated.
  Final Drive: Chain and sprocket, 1:1 ratio with OSHA approved chain guard.
  Belt Speed: 14 FPM maximum, on VFD
Bale Indexer Pusher 125 (Two Each)
Bale Pusher is comprised of a 40" wide×30" high×⅜" thick pusher plate mounted on a 9' long horizontal 6×3 slide tube and frame.
  Slide: Fabricated slide head consist of (2) ⅜" plates which support the pusher plate and house the 6" wide×3" high×2' long rectangular opening fitting over the 6"×3" slide tube. The slide is lined with ½" thick UHMW.
  Support Frame: The assembly is mounted on a tube steel support frame 9' long with 4' long legs at each end.
  Linear actuator: The linear actuator has an 8'6" long rack mounted to the frame and the pinion gear and 1 HP 480/3phase motor is mounted on the slide, providing an 8'6" long stroke of the pusher.
  Limit Switches: Allen Bradley proximity limit switches are located at each end of the stacker.
  Mounting: BCI-1201 is a separate device and is mounted along the side of BCI-1201 to push 8' bales onto BC-1202 Conveyor.
  Rate: 60 Bales per Hour.
Bale Stop 126 (Two Each)
Bale Clamp: Mil-Stak 8' wide bale clamp with 4' long clamp arms, hydraulic cylinders and limit switches.
Bale Clamp Support Frame: 8" wide flanged 4-column frame over BC-1202 and bolted to a foundation.
Hydraulic Supply: From P-1201 Hydraulic Pump System
Bale Metering Conveyor 128 (Two Each)
  Materials: Carbon Steel—2 coats finished paint.
  Size: 5' wide slider bed×18' long.
  Frame: 8" channel with a ¼" thick slider bed.
  Side Boards: ¼" thick plate reinforced with 2½"×2½" angle at top, bolted to the 8" channel frame. Height 3'.
  Legs: 2 sets 6" channel legs.
  Head Pulley: 5' wide×18" diameter crowned and lagged steel pulley with 2" shaft, out board bearings Dodge flanged 4-bolt type.
  Tail Pulley: 5' wide×12" diameter steel pulley with 1½" diameter bearings mounted in Dodge take-up bearing frame with 6" of take up.
  Snub Pulley: 5' long×10" diameter with 1½" shaft, and Dodge 4 bolt flanged bearings.
  Return Pulley: None
  Belting: Apache 2-ply number 26C, 220 PIW, heavy duty belting 5' wide.
  Drive: Dodge parallel shaft reducer with 3 HP 480/3phase motor inverter duty rated.
  Final Drive: Chain and sprocket, 1:1 ratio with OSHA approved chain guard.
  Belt Speed: 10 FPM, on VFD
Bale Hydraulic Pump 132 (Two Each)
  The hydraulic power pack consists of a 20-gallon oil reservoir, 30 GPM hydraulic pump with external relief valves, supply pressure operating at 2000 PSI. System includes return filters, reservoir, electric heater for winter operation, and an oil cooler for summer operation.

The invention has been shown and described above with the preferred embodiments, and it is understood that many modifications, substitutions, and additions may be made which are within the intended spirit and scope of the invention. From the foregoing, it can be seen that the present invention accomplishes at least all of its stated objectives.

What is claimed is:

1. A method of conveying bales of plant material to a shredder, the method comprising:
   placing the bales in line on a conveyor assembly;
   automatically arranging the bales on the conveyor assembly to be adjacent to one another, without manual intervention, wherein the arranging of the bales includes indexing, accumulating and metering of the bales; and
   discharging the bales into the shredder.

2. The method of claim 1 wherein the indexing, accumulating and metering steps occur sequentially.

3. The method of claim 2 wherein the indexing, accumulating and metering steps take place on separate conveyors.

4. The method of claim 1 wherein the bales are arranged to provide a continuous flow of bales into the shredder.

5. The method of claim 1 further comprising sensing the arrangement of the bales with a sensor, and providing feedback from the sensor to actuate changes in the arrangement.

6. The method of claim 1 further comprising forming the bales from agricultural crop residue material selected from a group comprising of corn stover, soybean stubble, and sorghum residue.

7. A method of conveying bales of plant material to a shredder, comprising:
   placing the bales in line on a conveyor assembly;
   arranging the bales on the conveyor assembly so as to be adjacent to one another, without manual intervention, wherein arranging the bales includes indexing, accumulating and metering of the bales;
   discharging the bales into the shredder; and
   wherein the bales are arranged to provide a continuous flow of bales into the shredder.

8. The method of claim 7 wherein the bales are arranged automatically.

9. The method of claim 7 wherein the indexing, accumulating and metering steps occur sequentially.

10. The method of claim 7 wherein the indexing, accumulating and metering steps take place on separate conveyors.

11. The method of claim 7 further comprising sensing the arranging of the bales with a sensor, and providing feedback from the sensor to actuate changes in the arrangement.

12. The method of claim 7 further comprising forming the bales from agricultural crop residue material selected from a group comprising of corn stover, soybean stubble, and sorghum residue.

13. A method of conveying bales of plant material to a shredder, comprising;
    forming the bales from agricultural crop residue material selected from a group comprising of corn stover, soybean stubble, and sorghum residue;
    placing the bales in line on a conveyor assembly;
    automatically arranging the bales on the conveyor assembly so as to be adjacent to one another, without manual intervention; and
    discharging the bales into the shredder.

14. The method of claim 13 wherein the arranging step includes indexing, accumulating and metering of the bales.

15. The method of claim 14 wherein the indexing, accumulating and metering steps occur sequentially.

16. The method of claim 15 Wherein the indexing, accumulating and metering steps take place on separate conveyors.

17. The method of claim 13 wherein the bales are arranged to provide a continuous flow of bales into the shredder.

18. The method of claim 13 further comprising sensing the arranging of the bales with a sensor, and providing feedback from the sensor to actuate changes in the arrangement.

19. A method of conveying bales of plant material to a shredder, comprising:
    placing the bales in line on a conveyor assembly;
    arranging the bales on the conveyor assembly to be adjacent to one another, without manual intervention; and
    discharging the bales into the shredder; and
    sensing the arranging of the bales with a sensor, and providing feedback from the sensor to actuate changes in the arrangement;
    wherein the bales are arranged to provide a continuous flow of bales into the shredder.

20. The method of claim 19 wherein the arranging step includes indexing, accumulating and metering of the bales.

21. The method of claim 19 further comprising forming the bales from agricultural crop residue material selected from a group comprising of corn stover, soybean stubble, and sorghum residue.

22. A method of conveying bales of plant material to a bale shredder, comprising:
    forming the bales from agricultural crop residue material selected from a group comprising of corn stover, soybean stubble, and sorghum residue;
    placing the bales in line on a conveyor assembly;
    arranging the bales on the conveyor assembly so as to be adjacent to one another, without manual intervention, wherein the bales are arranged to provide a continuous flow of bales into the shredder; and
    discharging the bales into the shredder.

23. The method of claim 22 wherein the bales are arranged automatically.

24. The method of claim 22 wherein the arrangement step includes indexing, accumulating and metering of the bales.

25. The method of claim 24 wherein the indexing, accumulating and metering steps occur sequentially.

26. The method of claim 24 wherein the indexing, accumulating and metering steps take place on separate conveyors.

27. The method of claim 22 further comprising sensing the arranging of the bales with a sensor, and providing feedback from the sensor to actuate changes in the arrangement.

* * * * *